(12) United States Patent
Hooft et al.

(10) Patent No.: US 9,192,175 B2
(45) Date of Patent: *Nov. 24, 2015

(54) PROCESS FOR FOIL RIPENING OF CHEESE

(75) Inventors: Corstiaan Johannes Hooft, Maastricht (NL); Ferdinand Theodorus Jozef Van Rijn, Delft (NL); Jacobus Stark, Rotterdam (NL); Albert-Jon Vis, Rotterdam (NL); Josien Krijgsman, Maastrict (NL)

(73) Assignee: DSM IP ASSETS B.V., Heerlen (NL)

( * ) Notice: Subject to any disclaimer, the term of this patent is extended or adjusted under 35 U.S.C. 154(b) by 416 days.

This patent is subject to a terminal disclaimer.

(21) Appl. No.: 13/201,921

(22) PCT Filed: Feb. 16, 2010

(86) PCT No.: PCT/EP2010/051916
§ 371 (c)(1),
(2), (4) Date: Nov. 1, 2011

(87) PCT Pub. No.: WO2010/094682
PCT Pub. Date: Aug. 26, 2010

(65) Prior Publication Data
US 2012/0052166 A1   Mar. 1, 2012

(30) Foreign Application Priority Data

Feb. 17, 2009  (EP) ..................... 09152973

(51) Int. Cl.
| | |
|---|---|
| *A23C 19/16* | (2006.01) |
| *B65D 85/84* | (2006.01) |
| *B65D 85/76* | (2006.01) |
| *A23C 19/10* | (2006.01) |
| *B65D 65/42* | (2006.01) |
| *B65D 81/20* | (2006.01) |
| *B65D 81/28* | (2006.01) |

(52) U.S. Cl.
CPC .............. *A23C 19/166* (2013.01); *A23C 19/10* (2013.01); *B65D 65/42* (2013.01); *B65D 85/76* (2013.01); *B65D 81/2023* (2013.01); *B65D 81/28* (2013.01)

(58) Field of Classification Search
CPC ........ B65D 85/76; B65D 81/30; B65D 81/24; B65D 81/00; B65D 81/18; B65D 85/00; B65D 85/50; A23C 19/166; A23C 19/10; A23C 19/16
USPC .......................... 426/118, 130, 323, 418, 419
See application file for complete search history.

(56) References Cited

U.S. PATENT DOCUMENTS

| | | | | |
|---|---|---|---|---|
| 2,882,169 | A | * | 4/1959 | Kielsmeier et al. ........... 426/130 |
| 3,060,035 | A | * | 10/1962 | Berst ................................. 426/8 |
| 5,167,974 | A | | 12/1992 | Grindrod et al. |
| 5,194,283 | A | * | 3/1993 | Dupas et al. ................... 426/582 |
| 2002/0034622 | A1 | * | 3/2002 | Edwards et al. ............... 428/220 |
| 2003/0087003 | A1 | * | 5/2003 | Ang ................................. 426/61 |
| 2007/0042089 | A1 | * | 2/2007 | Grah ............................. 426/106 |
| 2007/0104836 | A1 | | 5/2007 | Zhao et al. |

FOREIGN PATENT DOCUMENTS

| | | | | |
|---|---|---|---|---|
| DE | 10 2004 06011 | | 7/2005 | |
| DE | 102004060111 | A1 * | 7/2005 | ............. A23C 19/14 |
| EP | 0 384 553 | * | 2/1990 | ............. A23C 19/032 |
| EP | 1 041 010 | A1 * | 10/2000 | ............. B65D 81/20 |
| EP | 1 842 794 | A1 * | 10/2007 | ............. B65D 81/26 |
| EP | 1 902 624 | | 3/2008 | |
| NL | EP 1 915 911 | A1 * | 4/2008 | ............. A23C 19/032 |
| WO | WO 02/47904 | * | 6/2002 | ............. B32B 27/00 |
| WO | WO 2005/102062 | * | 11/2005 | ............. A22C 13/00 |
| WO | WO 2005/113236 | | 12/2005 | |
| WO | WO 2009010547 | A1 * | 1/2009 | ............. A01N 43/90 |

OTHER PUBLICATIONS

Sebti et al. ("Edible Bioactive Fatty Acid-Cellulosic Derivative Composites Used in Food-Packaging Applications", J. Agric. Food Chem., 50, pp. 4290-4294, pub. 2002).*
Scannell et al. ("Development of bioactive food packaging materials using immobilised bacteriocins Lacticin 3147 and Nisaplin", International Journal of Food Microbiology, 60(2000), pp. 241-249, pub. 2000).*
Oliveira et al. ("Development and Evaluation of Antimicrobial Natamycin-incorporated Film in Gorgonzola Cheese Conservation", Packag. Technol. Sci. 2007; 20: 147-153, pub. online Oct. 18, 2006 in Wiley InterScience).*
International Search Report for PCT/EP2010/051916, mailed Jul. 1, 2010.
Written Opinion for PCT/EP2010/051916, mailed Jul. 1, 2010.
Scannel et al., "Development of bioactive food packaging materials using immobilized bacteriocins lacticin 3147 and Nisaplin(R)", *International Journal of Food Microbiology*, vol. 60, No. 2-3, Sep. 2000, pp. 241-249.
Sebti et al., "Edibible bioactive fatty acid-cellulosic derivative composites used in food-packaging applications", *Journal of Agricultural and Food Chemistry*, vol. 50, No. 15, Jul. 2002, pp. 4290-4294.

(Continued)

*Primary Examiner* — Rena L Dye
*Assistant Examiner* — Lela S Williams
(74) *Attorney, Agent, or Firm* — Miles & Stockbridge PC

(57) ABSTRACT

The present invention relates to a process for preparing foil-ripened cheese comprising (i) introducing brined cheese into a cheese-ripening packaging containing an opening for receiving cheese, (ii) closing the packaging, and (iii) ripening the cheese, characterized in that the cheese-ripening packaging comprises a thermoplastic film coated with an antimicrobial composition comprising a binding agent and at least one antimicrobial compound, whereby (a) said binding agent swells, softens or dissolves in the water that is released from the cheese during its ripening, (b) the antimicrobial composition becomes part of the water phase that, due to ripening, becomes present between the outer cheese surface and the packaging, (c) the antimicrobial compound is able to migrate in the water phase and (d) antimicrobial compound is transferred to the outer cheese surface.

20 Claims, No Drawings

(56) References Cited

OTHER PUBLICATIONS

Moreira de Oliveira et al., "Development and evaluation of antimicrobial natamycin-incorporated film in Gorgonzola cheese conservation", *Packing Technology and Science*, vol. 20, 2007, pp. 147-153.

Chen et al., "Antimicrobial and physiochemical properties of methycellulose and chitosan films containing a preservative", *Journal of Food Processing and Preservation*, vol. 20, Jan. 1996, pp. 379-390.

* cited by examiner

PROCESS FOR FOIL RIPENING OF CHEESE

This application is the U.S. national phase of International Application No. PCT/EP2010/051916 filed 16 Feb. 2010 which designated the U.S. and claims priority to EP patent application No. 09152973.5 filed 17 Feb. 2009, the entire contents each of which are herby incorporated by reference.

The invention relates to a process for preparing foil-ripened cheese, in particular of the half-hard or hard type, comprising (i) introducing cheese after brining (further referred to as brined cheese) into a cheese-ripening packaging containing an opening for receiving cheese, (ii) closing the packaging, and (iii) ripening the cheese thereby releasing water to obtain ripened cheese packed in an easily removable packaging. The present invention also relates to the cheese-ripening packaging and to the cheese thus obtained.

The conventional method, as referred to in EP 1287744, for preparing for example a Gouda cheese comprises a ripening step, wherein the cheese, after brining, is ripened at 12-14° C. to, minimally an age of four weeks. To protect the cheese after brining, the outside of the cheese is treated with a dispersion of antimicrobial compound and a polymer, usually polyvinylacetate, in water. During this ripening, referred to with the term "standard ripening" or, also, "natural ripening", the cheese loses moisture.

In the natural ripening process, the outside of the cheese obtained after brining is treated with such a dispersion which upon drying forms a protective coating around the cheese. As described in EP 1 537 785, said coating fulfills essentially the following demands:
- protection of the cheese against physical damage
- prevention of formation of cracks during ripening
- carrier of antimicrobial compounds and/or colorants
- avoiding contamination such as attachment of dirt and dust.

The processing of cheese usually involves applying aqueous dispersions of antimicrobial compounds and polymers, in particular polyvinyl acetate, having typically a solids content of between 35 and 48 wt %. The relatively viscous dispersion is generally either applied automatically by a coating machine, or manually, with a sponge or the like. A common coating procedure involves covering the sides and the top half of the cheese immediately after leaving the brine bath, then after 24-48 hours turning the cheese and treating the remaining part. This process of treating the sides and one half of the cheese is carried out several times, e.g. after 4, 6, 9, 12, and 15 days and thereafter at larger time intervals depending on the type of cheese, the required ripening time (e.g. young compared to old cheese), storage conditions and, possibly, other factors. Other coating procedures with different time intervals may also be applied. After application of this material to the cheese, a film is formed by the drying of the coating material. Under ware-house conditions (temperature and relative humidity, RH) a solid film is usually formed within 24 hours.

A major advantage of the natural ripening process is that cheese can be obtained with different ripening degrees, ranging from young cheese to old cheese.

Another major advantage is that the natural ripening process results, in case the required conditions are met, in cheese having a flavor that is usually appreciated as very good. Characteristics typical for a natural ripened cheese are very good flavor development, firmness, low stickiness, color deviation from the center of the cheese towards the surface of the cheese and the presence of a drying rind.

Another advantage of the natural ripening process is that microbial growth on the outer cheese surface is prevented or inhibited by the presence of antimicrobial compounds in the cheese coating. Microbial growth may arise due to for example the presence of yeasts, moulds and/or bacteria, in particular *Lactobacillus*, in the brine bath and/or the environment. The growth of Lactobacilli, yeasts and/or moulds on the outer cheese surface may result in deviation of taste and/or odor. Also some mould species might produce mycotoxins. In addition, when cut the cheese block into slices or bars, the contamination of moulds, yeasts and/or bacteria may be spread over the slices or bars, resulting in spoilage and thus a decrease of the shelf life. The growth of *Lactobacillus* on the outer cheese surface may result in deviation of taste.

A disadvantage of the natural ripening process, however, is that it is labor and/or cost (if automated) intensive, in particular covering the outer cheese surface with a coating of the antimicrobial composition. Another drawback of the current commercially available cheese coatings is that the coating is not easily removable resulting in cutting losses; when the cheese block is cutted into slices or bars or when grated, losses can run up to 4%, even up to 15%. Another disadvantage of the natural ripening process as described above is that excessive evaporative loss of water from the cheese may occur during ripening. To prevent excessive evaporative loss of water from the cheese during ripening, the relative humidity at storage is high (often >80%). However, under these storage conditions, an excess of undesired mould growth may occur.

Another method for ripening cheese of the half-hard or hard type is the less labor and/or cost intensive foil ripening process, as for example referred to in EP1287744. In this method the cheese is ripened without a coating by packing the brined cheese after brining in a multilayer foil as for example described in DE10062417 and is then ripened. Cheese ripened in this manner loses no or less moisture during ripening compared to the cheese ripened with the natural ripening process. Another advantage of the known foil ripening process is that, as the foil can easily be removed, foil-ripened cheese, which is often of rectangular shape, gives no or hardly any losses, when grated or cut into slices or bars.

However, a disadvantage of foil-ripening as described in EP1287744 is that, due to the high humidity in the packed cheese, microbial growth, in particular of yeasts and/or bacteria such as for example *Lactobacillus*, on the outer cheese surface occurs. The growth of yeasts and/or Lactobacilli on the cheese surface may result in deviation of taste and/or odor. In addition, when cut the cheese block into slices or bars, the contamination of yeasts and/or bacteria, in particular *Lactobacillus*, may be spread over the slices or bars, resulting in spoilage and thus a decrease of the shelf life. The growth of *Lactobacillus* on the cheese surface may result in deviation of taste. Despite the fact that the foil ripening packaging is usually vacuumized prior to closing the packaging in order to exclude oxygen and by that reducing the conditions for mould growth, also mould growth may exist due to imperfections and/or pinholes of the vacuumized packaging.

The object of the invention is to provide a process for foil-ripening of cheese of the half-hard or hard type in which ripened cheese with an improved microbial outer cheese surface quality (less or no growth of bacteria, moulds and/or yeasts) can be obtained.

The inventors have developed a cheese-ripening packaging that can surprisingly be used for obtaining foil-ripened cheese in particular of the half-hard or hard type with an improved microbial outer cheese surface quality. With the process of the present invention, the microbial outer cheese surface quality is remarkably increased, while the above mentioned advantages of the known foil ripening process are maintained, i.e.

little labor intensive ripening process and no or hardly any losses when grated or cut the ripened cheese into slices or bars. As outlined above, cheese for natural ripening is provided with a coating by treating both sides of the cheese several times with a coating composition. An advantage of the packaging used in the process of the present invention is that the antimicrobial composition needs to be provided to the film only once. Another advantage of the packaging is that producing and storing of the packaging as well as packaging of the cheese in said packaging can be effected without substantial loss of the antimicrobial composition. Only after release of water from the ripening cheese, the antimicrobial composition will become effective to combat microbial growth on the outer cheese surface.

The inventive cheese-ripening packaging in particular comprises a thermoplastic film coated with an antimicrobial composition comprising a binding agent and at least one antimicrobial compound, whereby (a) said binding agent swells, softens or dissolves in the water that is released from the cheese during its ripening, (b) the antimicrobial composition becomes part of the water phase that, due to ripening, becomes present between the outer cheese surface and the packaging, (c) the antimicrobial compound is able to migrate in the water phase and (d) antimicrobial compound is transferred to the outer cheese surface. As such, contact between the outer cheese surface and the antimicrobial composition is maximized.

The process of the present invention comprises
(i) introducing the entire cheese block obtained after brining into the cheese-ripening packaging,
(ii) closing the packaging, resulting in that the entire outer cheese surface is surrounded with said packaging,
(iii) ripening the cheese whereby (a) said binding agent swells, softens or dissolves in the water that is released from the cheese during its ripening, (b) the antimicrobial composition becomes part of the water phase that, due to ripening, becomes present between the outer cheese surface and the packaging, (c) the antimicrobial compound is able to migrate in the water phase and (d) preferably all of the antimicrobial compound is transferred to the outer cheese surface.

It is to be noted that the outer cheese surface is textured and is not entirely smooth as the outer cheese surface contains unevennesses, resulting in that, even after vacuumizing, the packaging does not adhere completely to the entire outer cheese surface. Furthermore, even if the packaging adheres closely to parts of the outer cheese surface, the adhesion may be disrupted following release of water from the cheese that is ripened. The inventors have developed a cheese-ripening packaging that is able, under cheese ripening conditions, to transfer antimicrobial compound to the outer cheese surface despite the release of water from the cheese in opposite direction and even to the outer cheese surface where unevennesses exist.

The cheese-ripening packaging comprises a coated film comprising (a) a polymeric substrate layer being a thermoplastic film and (b) on a surface of the polymeric substrate layer a coating comprising a binding agent and an antimicrobial compound. It is to be noted that the coated antimicrobial composition may or may not exist solely as a surface coating. For example, a part of the antimicrobial composition may penetrate the structure of the thermoplastic film. Alternatively, the thermoplastic film prevents impregnation of the antimicrobial composition, for example obtained by corona treating the thermoplastic film prior to providing the antimicrobial composition to the film. Accordingly, as used herein, the term coating is to be understood to mean that the film wall is not impregnated with the antimicrobial composition, but only has the antimicrobial composition on the surface thereof, but the term may also apply that the film is impregnated with a part of the antimicrobial composition. The words thermoplastic film and polymeric substrate layer are used synonymous in this specification.

As used herein, an antimicrobial compound is a compound that prevents or at least reduces the outgrowth of microorganisms on cheese, such as yeasts, moulds and/or bacteria, regarding bacteria in particular *Lactobacillus*. The antimicrobial composition thus comprises, as antimicrobial compound, an antifungal compound and/or an antibacterial compound.

In a preferred embodiment, the antimicrobial composition comprises one or more antifungal compounds (against yeasts and/or moulds). Examples of antifungal compounds are polyene macrolide antimycotics such as natamycin and its functional derivatives, nystatin, lucensomycin and amphotericin B. Other examples of antifungal compounds are organic acids such as benzoic acid, sorbic acid, propionic acid and lactic acid; salts of said organic acids such as benzoate, sorbate, propionate and lactate; imidazoles and their salts such as imazalil; chitosan e.g. originated from moulds, yeasts or shrimps. The antimicrobial composition may also contain a combination of two or more of these compounds. Preferred antifungal compounds are natamycin, functional derivatives of natamycin, sorbic acid and salts of sorbic acid; or a mixture of at least two of these compounds. Most preferred antifungal compounds are natamycin and functional derivatives of natamycin. Any type of natamycin may be used, for example natamycin having a plate-like form, needle shaped natamycin and micronized natamycin. Also a mixture of different type of natamycin may be used. Non-limited examples of types of natamycin are for example described in WO9508918, U.S. Pat. No. 6,228,408 and WO06045831 and WO08110626. Preferred types of natamycin are micronized particles of natamycin such as for example described in WO08110626 and natamycin comprising needle shaped crystals such as for example described in WO06045831. Natamycin comprising needle shaped crystals preferably comprises at least 90 wt. % of needle shaped crystals. The mean length of the needle shaped crystals is preferably between 0.1 and 20 μm. The mean diameter of the needle shaped crystals is preferably between 0.1 and 2 μm. By length and diameter is meant the length and diameter as measured with an Olympus microscope (type BH-2) with a total used magnification of 1000 times, whereby the length is the largest length size of the crystal and the diameter is the size of the thickness of the crystal measured in the middle of the length and perpendicular to the length direction. The mean length and the mean diameter are both determined by measuring at least 100 crystals. Micronized natamycin particles preferably have a mean diameter of 10 μm or less, more preferably 5 μm or less, even more preferably 3 μm or less and even more preferably 1 μm or less. It has been found that using the preferred types of natamycin results in that the advantages of the present invention are even more pronounced.

In another preferred embodiment, the antimicrobial composition comprises one or more antibacterial compounds. Examples of antibacterial compounds are organic acids such as benzoic acid, sorbic acid, propionic acid and lactic acid; salts of said organic acids such as benzoate, sorbate, propionate and lactate; bacteriocins such as nisin or pediocin; lysozymes such as lysozyme from chicken eggs or from bacteriophages; chitosan e.g. originated from mould yeasts or shrimps. Preferred antibacterial compounds are nisin, lysozyme and sorbic acid and functional derivatives of sorbic acid. Most preferred antibacterial compounds are sorbic acid and functional derivatives of sorbic acid, in particular salts of sorbic acid.

In still another preferred embodiment, the antimicrobial composition comprises one or more antifungal compounds and one or more antibacterial compounds.

The amount of antimicrobial compounds effective to prevent or inhibit microbial growth on said outer cheese surface is preferably from 0.000001 to 200 mg/dm$^2$, more preferably from 0.00001 to 100 mg/dm$^2$, and even more preferably from 0.00005 to 10 mg/dm$^2$.

The antimicrobial composition further comprises a binding agent. For the purposes of the present invention, the binding agent will be effective to adhere the antimicrobial composition to the thermoplastic film such that the surface of the film is coated with the antimicrobial composition. The binding agent will also be effective to keep the antimicrobial compound adhered to the cheese ripening packaging before application on the cheese. Furthermore, the binding agent will be effective to make the antimicrobial composition becoming part of the water phase that, due to ripening, becomes present between the outer cheese surface and the packaging; and to make the antimicrobial compound being able to migrate in the water phase.

The binding agent is preferably selected from the group of a polymer, a protein, a polysaccharide, or a mixture thereof.

In one preferred embodiment, the binding agent is a polymer, preferably polyethylene glycol or polyvinyl alcohol or a mixture of at least two of these polymers. Preferably, polyvinyl alcohol is used as binding agent as this may result in that a higher amount of antimicrobial compounds can be provided in the cheese-ripening packaging. More preferably, polyvinyl alcohol with ultra low, low or middle molecular weight Mw is used. Preferably the viscosity of the polyvinyl alcohol is at least 3 mPa·s, more preferably at least 4 mPa·s. Preferably the viscosity of the polyvinyl alcohol is at most 30 mPa·s, more preferably at most 22 mPa·s. Preferably polyvinyl alcohol with a hydrolysis degree of between 88 and 98% is used as binding agent. In this embodiment, the antimicrobial composition preferably further comprises a thickening agent to increase the viscosity of the antimicrobial composition. Suitable thickening agents include, but are not limited to, agar, alginic acid, alginate, xanthan gum, carrageenan, gellan gum, guar gum, acetylated distarch adipate, acetylated oxidised starch, arabinogalactan, ethyl cellulose, methyl cellulose, locust bean gum, starch sodium octenylsuccinate, and triethyl citrate. A preferred thickening agent is xanthan gum.

In another preferred embodiment, the binding agent is a protein, a polysaccharide, or a mixture thereof. More preferably, the antimicrobial composition comprises a polysaccharide, even more preferably a cellulose derivative as binding agent. The cellulose derivative is preferably a cellulose ether, more preferably methyl hydroxyethyl cellulose, hydroxypropyl methyl cellulose or a mixture thereof. Even more preferably the cellulose derivative is methyl hydroxyethyl cellulose.

The antimicrobial composition present in the cheese-ripening packaging preferably comprises a binding agent in an amount of from 99,999 wt. % up to 60 wt. % and an antimicrobial compound in an amount from 0.001 wt. % and 40 wt. %, based on the weight of the total composition. The amount in which the antimicrobial compound is applied depends quite crucially upon its type.

The antimicrobial composition may further comprise at least one additional compound selected from the group consisting of a sticking agent, a surfactant, an emulsifier, a detergent, a preservative, a stabilizer, a spreading agent, an antioxidant, an anti-foam-forming agent, a wetting agent, a further antimicrobial agent, a filler, a spray oil, a dispersing agent, and a flow additive.

The antimicrobial composition applied to the thermoplastic film is preferably liquid, more preferably the antimicrobial composition is an aqueous composition, in particular an aqueous solution or suspension.

The antimicrobial composition can be prepared by methods known to a man skilled in the art. In a preferred method, the process for the manufacture of a antimicrobial composition as herein described comprises the following steps:
  I) preparing an aqueous solution of the binding agent(s);
  II) admixing of the antimicrobial compound(s) to obtain a suspension or a solution.

The antimicrobial composition preferably has a viscosity higher than 50 mPa·s, more preferably higher than 100 mPa·s (measured at Physica UDS; spindle Z3, shear rate: 14.4 1/s, temperature=22-23° C.) and a viscosity lower than 460 mPa·s, more preferably lower than 450 mPa·s. It has been found that a viscosity of between 50 mPa·s and 460 mPa·s results in that the antimicrobial composition can advantageously be coated on the thermoplastic film.

The coated film may further comprise a tie layer between the thermoplastic film (polymeric substrate layer) and the coating.

The coated film is advantageously obtained by a process comprising the following steps:—
  (a) providing a thermoplastic polymeric substrate layer,
  (b) coating the substrate layer with an aqueous antimicrobial composition, and
  (c) drying the coated film, and
  (d) processing the coated film to a reel for further transport.

The antimicrobial composition can be applied onto the polymeric substrate layer by any method know in the art, for example by means of extrusion coating, spraying, spreading, dipping, immersing, painting or printing. In a particularly simple process, the coating is applied to a flat thermoplastic substrate layer with the aid of a coating roller.

Preferably, the thermoplastic film is a monolithic film. As used herein, a monolithic film is a film not containing holes, perforations, pores or micro-pores that provide a direct pathway for water molecules to flow. On contrast, a monolithic film contains molecular level pathways for diffusion of water.

In one embodiment of the present invention, the thermoplastic film (polymeric substrate layer) has a water vapor transmission rate of less than 0.1 g/m$^2$/24 hours at 10° C. and 85% relative humidity. In this embodiment of the present invention, the antimicrobial composition comprises one or more anti-microbial compounds such as an anti-fungal compound, e.g. natamycin, sorbic acid or its salts, and propionic acid or its salts; and/or an anti-bacterial compound, e.g. nisin, lysozyme, sorbic acid or its salts. Preferably, the antimicrobial composition comprises at least one anti-fungal compound and at least one anti-bacterial compound. In this embodiment, the thermoplastic film is a multilayer film containing at least a water barrier layer usually comprising mainly polyolefin, in particular polyethylene, and an oxygen barrier layer usually comprising polyamide and/or EVOH.

In a second embodiment of the present invention, the thermoplastic film (polymeric substrate layer) is a thermoplastic film having a water vapor transmission rate of at least 10 g/m$^2$/24 hours at 10° C. and 85% relative humidity (measured according to ASTM E96B cup test at 10° C. and 85% relative humidity on a film). Preferably, the water transmission rate is at least 20 g/m$^2$/24 hours, more preferably at least 25 g/m$^2$/24 hours and even more preferably at least 30 g/m$^2$/24 hours (measured according to ASTM E96B cup test at 10° C. and 85% relative humidity on a film). Preferably, the polymeric substrate layer has a water vapor transmission rate of at most 60 g/m$^2$/24 hours, more preferably at most 50 g/m$^2$/24 hours and even more preferably at most 40 g/m$^2$/24 hours (measured according to ASTM E96B cup test at 10° C. and 85% relative humidity on a film). At a water vapor transmission rate higher than 60 g/m$^2$/24 hours, the surface of the cheese may dehydrate too much resulting in a thick dehydrated surface. The presence of such a thick dehydrated surface may result in that the obtained consistency of the cheese deviates from the consistency that one would expect at the given ripening time. In this second embodiment, the thermoplastic film is preferably a monolithic film.

It has been found that in this second embodiment of the invention ripened cheese, in particular of the half-hard or hard type, can be obtained that corresponds more to the natural ripened cheese. A further advantage of this embodiment is that further ripening can be effected with no or reduced flavor deviation, with no or reduced consistency deviation and/or with no or reduced mould, yeast and bacterial growth compared to the known foil-ripening process. Thus the ripened cheese obtained in this embodiment has characteristics that corresponds more to the characteristics typical for a natural ripened cheese. Another advantage of this embodiment is that cheese can be obtained with a dry-rind, as is also present in a natural ripened cheese, but without a plastic coating. The presence of such a dry-rind influences the further ripening by building a resistance to further excessive drying. Moreover, the presence of such a dry-rind makes the foil ripened cheese even more resembling a natural-ripened cheese. A dry-rind has a moisture content that is less than that of the average of the cheese. Still another advantage of this embodiment is that ripened cheese can be obtained with a color deviation from the center to the rind resulting in that the foil ripened cheese even more resembles a natural-ripened cheese. Still another advantage of this embodiment is that the ripening process can be controlled by means of the relative humidity of the atmosphere in the warehouse. Still another advantage is that the relative humidity of the atmosphere in the warehouse in different compartments and/or phases of the ripening can be lowered, even to 70%. A lower relative humidity of the atmosphere in the warehouse may result in less mould growth in the surrounding area. Furthermore, a lower relative humidity of the atmosphere in the warehouse is advantageous from an energetically point of view. The thermoplastic polymer used for the thermoplastic film(s) is preferably a polyamide, a polyester, a polyether, the copolymers thereof or a mixture of at least two of these thermoplastic polymers. Preferred copolymers are block copolymers. More preferably, the thermoplastic polymer used for the thermoplastic film is polyamide, polyetherester, polyetheramide or mixtures thereof. Examples of suitable polyamides (PA) are aliphatic polyamides, that may eventually be branched polyamides, such as PA6, PA46, PA66, PA 11, PA12, semi aromatic polyamides as MXD6, PA6I/6T, PA66/6T, fully aromatic polyamides and copolymers and blends of the listed polyamides. The effect of the invention is most favourable in compositions comprising polyamide having high amide content, such as for example PA-6 in contrast to for example PA-11 or PA-12, since these polyamides as such have higher water vapour transmission rates than PA-11 or PA-12. Examples of suitable polyesters are polyethylene terephtalate (PET), polybutylene terephtalate (PBT), polypropylene terephtalate (PPT), polyethylene naphtanoate (PEN), polybutylene naphtanoate (PBN). A polyetherester respectively a polyetheramide block copolymer is understood to be a copolymer containing soft blocks of a polyether and hard polyester respectively polyamide blocks. The polyether blocks are preferably those derived from base or acid-catalyzed ring-opening polymerization of cyclic ethers such as epoxides, oxetanes, oxolanes, and the like. The polyethers have repeat units of oxyalkylene groups (—O-A-) in which A preferably has from 2 to 10 carbon atoms, more preferably 2 to 4 carbon atoms. The polyethers can have different end groups, depending upon how the polyethers are made or modified. For example, the polyether can have hydroxyl, ester, ether acid, olefinic, or amino end groups, or the like, or combinations of these. Mixtures of different types of polyethers can be used. Preferred polyethers are polyether polyols. Examples of polyether polyols include, but are not limited to, polyoxypropylene polyols, polyoxyethylene polyols, ethylene oxide-propylene oxide copolymers, polytetramethylene ether glycols, oxetane polyols, and copolymers of tetrahydrofuran and epoxides. Typically, these polyols with have average hydroxyl functionalities from about 2 to about 8. Preferred aliphatic polyether are a poly(alkylene oxide) derived from an alkylene oxide of 2-6 C-atoms, preferably 2-4 C-atoms, or combinations thereof. Examples include poly(ethylene oxide), poly(tetramethylene oxide), poly(propylene oxide) and ethylene oxide-terminated poly(propylene oxide). Suitable polyester respectively polyamide blocks in the polyetherester respectively polyetheramide block copolymers are those defined above for the polyester respectively the polyamide. The hard polyester block is preferably built up from ethylene terephthalate or propylene terephthalate repeating units, and in particular from butylene terephthalate units. Preferred polyester blocks are PBT blocks. Preferred polyamide blocks are aliphatic polyamide blocks, preferably PA6, PA66 or PA12. Examples and preparation of block copolyesters are for example described in Handbook of Thermoplastics, ed. O. Olabishi, Chapter 17, Marcel Dekker Inc., New York 1997, ISBN 0-8247-9797-3, in Thermoplastic Elastomers, 2nd Ed, Chapter 8, Carl Hanser Verlag (1996),
ISBN 1-56990-205-4, in Encyclopedia of Polymer Science and Engineering, Vol. 12, Wiley & Sons, New York (1988), ISBN 0-471-80944, p. 75-117, and the references cited therein. The polyetherester and the polyetheramide preferably has a polyether content of at least 30 wt. %. The amount of polyetherester and/or polyetheramide in the thermoplastic film is preferably such that the ether content is at least 1 wt. %, more preferably at least 2 wt. % and even more preferably at least 4 wt. % (relative to the total amount of thermoplastic polymers in the thermoplastic film). The amount of polyetherester and/or polyetheramide in the thermoplastic film is preferably such that the ether content is at most 70 wt. % (relative to the total amount of thermoplastic polymers in the thermoplastic film). Even more preferably, the thermoplastic polymers used in the thermoplastic film consist essentially of polyamide and polyetheramide and/or polyetherester. It has surprisingly been found that a packaging comprising such a thermoplastic film, in comparison to a state of the art cheeseripening film can advantageously be applied for further ripening, while less negatively influencing the flavor development, consistency, and the mould and yeast growth. More preferably, the thermoplastic polymers used in the thermoplastic film consist essentially of 70 to 90 wt. % of polyamide and 10 to 30 wt. % polyetherester (relative to the total amount of thermoplastic polymers in the thermoplastic film). The polyetherester preferably has a polyether content of at least 30 wt. %. In this second embodiment of the present invention, preferably at least the part of the packaging that will surround the cheese to be ripened does not contain polyolefin in substantial amounts. The amount of polyolefin (relative to the total packaging) is preferably at most 30 wt %, more preferably at most 20 wt. % and even more preferably at most 10 wt. %. Even more preferably, at least the part of the packaging that will surround the cheese to be ripened does not contain polyolefin.

In this second embodiment of the present invention, the antimicrobial composition comprises one or more anti-microbial compounds such as an anti-fungal compound, e.g. natamycin, sorbic acid or its salts, and propionic acid or its salts; and/or an anti-bacterial compound, e.g. nisin, lysozyme, sorbic acid or its salts.

In this second embodiment, the process for foil ripening further comprises storing the foil packaged cheese to be ripened such that moisture can leave the foil packaged cheese. This can for example be obtained by leaving enough room between the stored foil packaged cheeses and/or by regulating the relative humidity of the environment such that the environment has a lower relative humidity than the relative humidity of the cheese.

The thermoplastic film (polymeric substrate layer) has an oxygen permeability of at most 100 $cm^3/m^2$.24 hours.atm (measured according to ASTM standard D3985 at 10° C. and 85% relative humidity on a film using Mocon equipment).

More preferably, the polymeric substrate layer has an oxygen permeability of at most 50 $cm^3/m^2$.24 hours.atm. Even more preferably, the oxygen permeability is at most 20 $cm^3/m^2$.24 hours.atm. Low oxygen permeability is advantageous as it results in further inhibition of mould growth.

The water transmission rate values and oxygen permeability values as referred to apply to at least the part of the packaging that will surround the cheese to be ripened.

Usually, the thermoplastic film(s) is produced from a melt by known techniques, such as for example cast-extrusion or extrusion-blowing.

In order to be able to function as a packaging, the packaging, as a rule, must possess sufficient mechanical properties such as for example puncture resistance and tear strength. In view of this, the thickness of the packaging is usually at least 15 µm and mostly at least 25 µm. The thickness of the polymeric substrate layer is usually at least 25 and at most 100 µm. The thickness of the coating is usually at least 0.1 µm ($10^{-6}$ m).

In the process of the present invention, at least a part of the ripening process is performed while the cheese is present in the cheese-ripening packaging, preferably the entire ripening process is effected while the cheese is present in the cheese-ripening packaging.

The cheese-ripening packaging comprises a thermoplastic film that is coated with an antimicrobial composition. In one embodiment, the thermoplastic film is a single thermoplastic layer. In another embodiment, the thermoplastic film consists of two or more thermoplastic layers of different or the same composition. Multilayer films can be obtained by methods known in the art such as co-extrusion or lamination. Each thermoplastic layer can be a blend of several thermoplastic polymers.

Preferably, the packaging adheres closely to the surface of the cheese to be ripened in order to reduce the amount of air that is present between the cheese and the packaging, in particular at the beginning of the ripening process. The presence of air is disadvantageous as this may result in inadequate moisture leave and hence in a ripening process that is non-homogeneous over the entire cheese. The presence of air is also disadvantageous as this may result in the undesirable formation of moulds. In view of this, the packaging is preferably heat shrinkable and/or the process further comprises vacuumizing prior to closing the packaging. Such vacuumizing is known in the art and are for examples described in The Wiley Encyclopedia of Packaging Technology, Aaron L. Brody, Kenneth S. marsh—$2^{nd}$ ed., ISBN 0-471-06397-5, p 949-955. Vacuumizing is performed at a pressure of 0.5-100 mbar, for hard to semi-hard cheese preferably at 5-25 mbar. Vacuumizing is advantageous as it exclude oxygen and by that reduces the conditions for mould growth.

In a preferred embodiment of the invention, the cheese-ripening packaging is a bag. In this embodiment, the process comprises introducing cheese to be ripened into a bag and closing the bag by, preferably hermetically, sealing the opening for receiving the cheese to be ripened. The bag may be produced from the coated film and contain at least one seal.

The ripening process is preferably effected at ripening conditions that are optimal for a specific cheese type known to a man skilled in the art. For example for a Gouda type the ripening process is preferably effected at decreased temperature such as for example a temperature between 12 and 14° C. and at a relative humidity of 75-85%. In general, the ripening lasts at least for 4 weeks (young cheese) and can last for example to obtain a matured cheese for 12 to 16 weeks and for obtaining an old cheese for at least 10 months.

Preferably, the cheese to be ripened is a Gouda, Emmental or Edam type, in particular the Gouda type or Edam type.

The present invention further relates to a cheese-ripening packaging containing an opening for receiving cheese to be ripened, wherein the cheese-ripening packaging comprises a thermoplastic film coated with an antimicrobial composition comprising a binding agent and at least one antimicrobial compound and the closed cheese-ripening packaging having dimensions corresponding to the dimensions of the ripened cheese block, whereby (a) said binding agent swells, softens or dissolves in the water that is released from the cheese during its ripening, (b) the antimicrobial composition becomes part of the water phase that, due to ripening, becomes present between the outer cheese surface and the packaging, (c) the antimicrobial compound is able to migrate in the water phase and (d) antimicrobial compound is transferred to the outer cheese surface. The present invention further relates to a cheese-ripening packaging further comprising cheese to be ripened or ripened cheese enclosed by said cheese-ripening packaging.

The present invention further relates to the cheese obtainable using the process according to the invention. When using, as polymeric substrate layer, a thermoplastic film having a water vapor transmission rate of at least 10 and at most 60 $g/m^2$/24 hours at 10° C. and 85% relative humidity (measured according to ASTM E96B cup test at 10° C. and 85% relative humidity on a film), the ripened cheese is in particular characterized in that it does not contain a plastic coating on the surface of the ripened cheese and in that the difference in L value at the surface of the cheese and at the center of the cheese block is higher than 0.5, preferably higher than 1 and even more preferably higher than 2. In particular, it has been found that after ripening a cheese block sized 35×30×11 cm for 16 weeks, the difference in L value at 2 mm below the center of the upper side surface ($L_1$) and at the center of the cross section obtained by cutting the cheese in half (such that a block of 35×15×11 cm is obtained) ($L_2$) is higher than 0.5 and lower than 11. As used herein, the L value of a color is a measure for the lightness of a color according to the Commission Internationale de l'Eclairage L*a*b* color space (CIE 1976; hereinafter "CIELab"). The L*a*b* colorimetric system was standardized in 1976 by Commission Internationale de l'Eclairage (CIE). The CIELab L value, utilized herein to define the darkness/lightness of the polymer composition according to the present invention, is a unit of color measurement in the afore-mentioned CIELab system. A color may be matched according to the Commission Internationale de l'Eclairage L*a*b* color space (hereinafter "CIELab"). CIELab is a mathematical tristimulus color scale based on the CIE 1976 standard. In the L*a*b* colorimetric system, L refers to lightness expressed by a numerical value of from 0 to 100, in which L=0 means that the color is complete black, and L=100 means that the color is complete white. The contrast between the center ($L_2$) and the surface ($L_1$) of a ripened cheese block sized 35×15×11 cm can be expressed as Δ L, ΔL is the difference in L values between the two colors and is calculated by: $\Delta L=L_2-L_1$.

The invention is now being demonstrated by means of a series of examples, but is not restricted in any way to the embodiments shown in the examples.

COMPARATIVE EXPERIMENTS A-F AND EXAMPLE I

Fresh brined cheeses were cut into cubes with an outer surface area of 15×25 cm. The area was divided into small areas of 5×5 cm. Each small area was contaminated with $3.5\times10^5$ of spores of *Penicillum discolor*, a mold strain with reduced natamycin sensitivity. From each foil (see below), 5 small pieces with an area of 5×5 cm were cut, which were randomly put onto the cheese surface with the active side down.

The cheese cubes were ripened at 15° C. in the dark at elevated humidity.

Because this test is very challenging, mold growth under these conditions will appear within a few days. The amount of mold growth has been monitored 6 days after start of the test. The results are given in Table 1. Scores were given in a scale from zero to five where zero stands for absence of visible growth and five stands for fully molding of the whole area.

Delvocoat® 04110=treatment of cheese with natamycin containing xanthan solution

Delvocoat® 04110 under foil=treatment of cheese with natamycin containing xanthan solution, followed by covering with a moisture permeable foil of 30 micron. The moisture permeable foil consists of an Akulon®/Arnitel® blend. The foil has an oxygen transmission rate OTR of 30 (ASTM D3985 at 10° c. and 85% RH) in cc/m2.day.atm and a water vapor transmission rate WVTR of 39 (ASTM E96b cup test at 10° c. and 85% RH) in g/m2.day.

MHEC=Methylhydroxyethyl cellulose (Walocel®MW 400, Dow Wolff Cellulosics).

A-2092+1 mg/dm² natamycin=moisture permeable foil (same as described above), coated with styrene copolymer dispersion containing natamycin; which coating is non-soluble in water.

BT-21+1 mg/dm² natamycin=moisture permeable foil (same as described above), coated with alkaline soluble aqueous acrylic polymer composition containing natamycin; which coating is non-soluble in water.

CAPA®6800+1 mg/dm² natamycin=foil prepared by (i) melting CAPA®6800 (a linear polyester with molecular weight 80000 derived from caprolactone monomer), (ii) adding natamycin powder to the melt and (iii) extruding the blend to a foil of 50 micron.

The same type of natamycin is used in all the examples for this trial.

TABLE 1

|  |  | Average mould score out of 5 |
|---|---|---|
| CEx A | Delvocoat ® 04110 | 0 |
| CEx B | Delvocoat ® 04110 under foil | 0 |
| CEx C | MHEC without natamycin | 5 |
| Ex I | MHEC + 1 mg/dm² natamycin | 1.2 |
| CEx D | A-2092 + 1 mg/dm² natamycin | 5 |
| CEx E | BT-21 + 1 mg/dm² natamycin | 5 |
| CEx F | CAPA + 1 mg/dm² natamycin | 5 |

EXAMPLES II-VIII AND COMPARATIVE EXPERIMENTS G-H

The aim of the experiments was to measure the differences in performance of preventing the outgrowth of unwanted surface flora. The experiment was executed by packing the cheeses with different coatings applied to the coating substrate while having the same ripening conditions (see table 2).

TABLE 2

|  | Packaging | Coating substrate (thermoplastic film) | Coating composition |
|---|---|---|---|
| G | Cryovac ® BB4 bag (non permeable) | n.a. | n.a. |
| H | Akulon ®/Arnitel ® blend (water permeable); 50μ | n.a. | n.a. |
| II | Cryovac ® BB4 bag (non permeable) | Akulon ®/Arnitel ® blend (water permeable); 30μ | MHEC + sub micron natamycin (coating 1) |
| III | Cryovac ® BB4 bag (non permeable) | Akulon ®/Arnitel ® blend (water permeable); 30μ | HPMC + sub micron natamycin (coating 2) |
| IV | Cryovac ® BB4 bag (non permeable) | Akulon ®/Arnitel ® blend (water permeable); 30μ | PV-OH + sub micron natamycin (coating 3) |
| V | Akulon ®/Arnitel ® blend (water permeable); 30μ | Akulon ®/Arnitel ® blend (water permeable); 30μ | MHEC + sub micron natamycin (coating 1) |
| VI | Akulon ®/Arnitel ® blend (water permeable); 30μ | Akulon ®/Arnitel ® blend (water permeable); 30μ | HPMC + sub micron natamycin (coating 2) |
| VII | Akulon ®/Arnitel ® blend (water permeable); 30μ | Akulon ®/Arnitel ® blend (water permeable); 30μ | PV-OH + sub micron natamycin (coating 3) |
| VIII | Akulon ®/Arnitel ® blend (water permeable); 30μ | Akulon ®/Arnitel ® blend (water permeable); 30μ | PV-OH + needle natamycin (coating 4) |

Cheese

For the experiments, freshly brined untreated Gouda 48+foil cheeses have been used. The cheeses are of the so called block shape and measure roughly 50×30×11 cm and weigh ca. 16 kg each. The cheeses are produced in Gerkesklooster and taken from one batch.

Packaging Material

To be able to evaluate the performance of the different bio active coatings, cheeses were packed in a bag consisting of both regular (non permeable) thermoplastic film as well as water permeable thermoplastic film. The different bio active coatings have been applied on permeable thermoplastic films. The reference bag (non-permeable thermoplastic film) is a Cryovac® BB4 bag. The permeable bag and permeable thermoplastic film material for applying the coating, consists of Akulon®/Arnitel® blend and have been produced with by the industry known conditions at a Kuhne blown film line. The permeability values are given in table 3.

TABLE 3

| PACKAGING | MATERIAL | | OXYGEN TRANSMISSION RATE OTR (ASTM D3985 AT 10° C. AND 85% RH) IN CC/M2.DAY.ATM | WATER VAPOR TRANSMISSION RATE WVTR (ASTM E96B CUP TEST AT 10° C. AND 85% RH) IN G/M2.DAY |
|---|---|---|---|---|
| 1 | Cryovac BB4 bag | 59 μm | Max 60* | <1 |
| 2 | Akulon ®/Arnitel ® | 50 μm | 20 | 30 |
| 3 | Akulon ®/Arnitel ® | 30 μm | 30 | 39 |

*see Cryovac datasheet, cm3/m2, 24 h, bar, measured at 23° C.; 0% RV, ASTMD-3985

Coating

Formulation of Coating Composition

The coating compositions were formulated by first preparing different stock solutions (i.e. hydrocolloid stock solutions and polyvinyl alcohol PV-OH stock solution; see table 4) and mixing the stock solutions with tape (sterile/microbial protected) water and with different preservative suspensions (see table 4) to the given concentrations and viscosity (<460 mPa·s measured on Physica UDS: spindle Z3, shear rate: 14.4 1/s, T=22-23° C.). Mixing was done with an overhead stirrer (Janke &Kunkel model RW 20DZM) and a scaled down Rushton turbine for 30-60 minutes at ambient conditions.

Preparing of Stock Solution

The hydrocolloids were mixed in tape water by overhead stirrer (Janke &Kunkel model RW 20DZM) and a scaled down Rushton turbine under ambient temperatures conditions until all hydrocolloids were hydrated (dissolved). The following binding agents are used: MHEC: Methylhydroxyethyl cellulose (Walocel®MW 400, Dow Wolff Cellulosics).

HPMC: hydroxylpropylmethyl cellulose (Methocel® A4C FG (Food Grade), Dow chemicals).

Polyvinyl Alcohol PV-OH: hydrolysis degree of 98%; viscosity 10 mPa·s (4% H2O, 20° C.); Mw~61000; degree of polymerisation 1400.

PV-OH was dissolved by heating up to 80° C. A special turbine was used to cut the PV-OH flakes in to smaller particles.

Xanthan gum (Keltrol® BT, CPKelco) was used as thickening agent in case the coating composition contains PV-OH as binding agent.

Preservatives Suspensions;

A Polyene Macrolide antimycotic Natamycin (from DSM) sub-micron particles or needle shaped particles in suspension.

In Table 4 an overview of the different coating compositions is presented.

TABLE 4

| Bio-active coating | Binder | wt. % | Natamycin mg/kg | Bio active format |
|---|---|---|---|---|
| | Hydrocolloids | | | |
| 1 | MHEC | 1.8 | 4300 | Sub-micron |
| 2 | HPMC | 2 | 4000 | Sub-micron |
| | PV-OH/xanthan | | | |
| 3 | 5 wt. % PV-OH/0.3 wt. % xanthan gum | 5.3 | 1800 | Sub micron |
| 4 | 5 wt. % PV-OH/0.3 wt. % xanthan gum | 5.3 | 1800 | Needles |

Coated Thermoplastic Film

The coating was applied to the coating substrate in a laboratory coating line. A 30 μm Akulon®/Arnitel® film of 300 mm width was fed into a Rotary Koater of RK Print Coat Instruments Ltd. in England. No corona treatment was applied; the drying of the coating was done by 2 hot air dryers (ca 85° C.). The wet coating thickness was 6 μm. For the experiments, sheets of 15×15 cm were cut out of the coated film.

Actual Packaging (See Table 2)

As a reference, a thermoplastic barrier bag (sample G) without bio active coating is used for packaging. As another reference a permeable thermoplastic bag (sample H) is used for packaging. To measure the performance of bio active coating to the cheese, prior to packaging the cheeses in a thermoplastic barrier bag (Cryovac® BB4 bag; examples II-IV) respectively a thermoplastic permeable bag (Akulon®/Arnitel® blend, 30μ; examples V-VIII), parts of the bottom and top surfaces of the cheeses were covered with a 30 μm permeable thermoplastic film coated with different compositions of bio active coating (coatings 1 to 4; table 4). This permeable thermoplastic film consists of a blend of Akulon® and Arnitel®. Sheets with different coatings (coating 1 to 4) measuring 15×15 cm are applied on the top and bottom side of each cheese (Examples II to VIII). For the samples of permeable thermoplastic film the total thickness at the coated area is 60 μm Akulon®/Arnitel® film.

Packaging Equipment

A Multivac C400 chamber vacuum machine was used for packing the cheeses. The cheese have been vacumized to 30 mbar pressure and for closing the bags the material was sealed for 0.7 seconds.

Ripening

After packaging, vacumizing and closing the packaging by sealing, the ripening of the cheeses was realized in a ripening cell with wooden shelves and an air treatment system for each individual cheese. Behind every cheese a piping system delivers airflow to control the environmental conditions near the cheese. The conditions in the cell were set at 13° C. and 85% RV. Cheeses have been ripened to maximum 6 weeks and are being turned every week.

Measurement

During the ripening of the cheeses, the following measurements have been done:

Weight measurement: the weight of the different cheese samples is measured. This non destructive measurement is done at week 0 (after packaging), 1, 2, 3, 4 and 6. The reduction of the weight of the cheeses in the course of the ripening represents the moisture loss of the cheeses in the course of the ripening.

Yeast count: cheese samples G and H and II to VIII are sent for analyses to the COKZ (controlling authority of the Netherlands for milk and milk products). Outer cheese surface area of 100 cm² of each sample have been swabbed using the cotton swab technique for flexible and uneven surfaces, a method known to a man skilled in the art. These yeast count analyses have been carried out at week 2, 4 and 6. For the different moments of measurement a 'new' cheese was used to prepare the samples G and H and II to VIII. The results of yeast count are given in table 5.

TABLE 5

| | Yeast as cfu/100 cm² | | |
|---|---|---|---|
| Example | Week 2 | Week 4 | Week 6 |
| G | 1.3E+04 | 7.1E+02 | 6.4E+02 |
| H | 2.1E+06 | 9.6E+04 | 7.8E+04 |
| II | 4.0E+01 | <20 | <20 |
| III | <20 | <20 | <20 |
| IV | <20 | <20 | <20 |
| V | 6.4E+02 | <20 | <40 |
| VI | <20 | <60 | <20 |
| VII | 1.3E+02 | <20 | <20 |
| VIII | 4.2E+03 | <20 | <20 |

The yeast count of the cheeses packed in a bag with bio active coating (examples II to VIII) was compared with the yeast count of cheeses packed in bags without bio active coating (comparative experiments G and H). The experiment proves that antimicrobials in a coating, which is in contact with the surface of the cheese, are freely available to the outer cheese surface. In comparison to the reference samples (G and H), the example of a fungicide e.g natamycin in MHEC, HPMC or PV-OH shows, as coating on film (examples II to VIII), an inhibition and even a discontinuation to outgrowth of yeast on the surface (see table 5). The use of sub-micron natamycin results in slightly quicker inhibition of yeast growth compared to needle natamycin.

From the experimental part, it can be concluded that the binding agent that swells, softens or dissolves in the water that is released from the cheese, effects that the antimicrobial composition becomes part of the water phase present between the uneven outer cheese surface and the packaging and that the natamycin is able to be transferred to the uneven cheese surface. As such, the natamycin becomes effective to combat microbial growth on said cheese surface.

The invention claimed is:

1. Process for preparing foil-ripened cheese comprising (i) introducing brined cheese into a cheese-ripening packaging containing an opening for receiving cheese, (ii) closing the packaging and (iii) ripening the cheese, wherein the cheese-ripening packaging comprises a thermoplastic film coated with an antimicrobial composition; the antimicrobial composition comprising a binding agent and at least one antimicrobial compound, wherein (a) said binding agent swells, softens or dissolves in water that is released from the cheese during its ripening, (b) the antimicrobial composition becomes part of water phase that, due to ripening, becomes present between the outer cheese surface and the packaging, (c) the antimicrobial compound is able to migrate in the water phase and (d) antimicrobial compound is transferred to the outer cheese surface, and wherein the thermoplastic film has a water vapor transmission rate of at least 10 g/m²/24 hours at 10° C. and 85% relative humidity.

2. Process according to claim 1, wherein the antimicrobial composition comprises a polyene macrolide antimycotic.

3. Process according to claim 1, wherein the binding agent is selected from the group of polymers, a protein, a polysaccharide, or a mixture thereof.

4. Process according to claim 1, wherein the antimicrobial composition comprises polyvinyl alcohol as binding agent and a thickening agent.

5. Process according to claim 1, wherein the antimicrobial composition comprises at least one cellulose derivative as binding agent.

6. Process according to claim 5, wherein the cellulose derivative is methyl hydroxyethyl cellulose and/or hydroxypropyl methyl cellulose.

7. Process according to claim 1, wherein the process further comprises vacuumizing prior to closing the packaging.

8. Process according to claim 1, wherein the cheese to be ripened is the Gouda or Edam type.

9. A cheese-ripening packaging containing an opening for receiving cheese to be ripened, wherein the cheese-ripening packaging comprises a thermoplastic film coated with an antimicrobial composition; the antimicrobial composition comprising a binding agent and at least one antimicrobial compound and the closed cheese-ripening packaging having dimensions corresponding to the dimensions of the cheese to be ripened, wherein (a) said binding agent swells, softens or dissolves in water that is released from the cheese during its ripening, (b) the antimicrobial composition becomes part of water phase that, due to ripening, becomes present between the outer cheese surface and the packaging, (c) the antimicrobial compound is able to migrate in the water phase and (d) antimicrobial compound is transferred to the outer cheese surface, and wherein the thermoplastic film has a water vapor transmission rate of at least 10 g/m²/24 hours at 10° C. and 85% relative humidity.

10. A foil-ripened cheese comprising cheese and a cheese-ripening packaging according to claim 9 wrapped around the cheese and closed by sealing.

11. Process according to claim 1, wherein the thermoplastic film has a water vapor transmission rate of at most 60 g/m²/24 hours at 10° C. and 85% relative humidity.

12. Process according to claim 1, wherein the thermoplastic film has an oxygen permeability of at most 100 cm³/m²/24 hours/atm at 10° C. and 85% relative humidity.

13. Process according to claim 1, wherein the thermoplastic film is a monolithic film.

14. Process according to claim 1, wherein the amount of antimicrobial compound is 0.000001 to 200 mg/dm².

15. Process according to claim 1, wherein the thermoplastic film has a water vapor transmission rate of at least 20 g/m²/24 hours at 10° C. and 85% relative humidity.

16. Process according to claim 1, wherein the thermoplastic film has a water vapor transmission rate of at least 30 g/m²/24 hours at 10 ° C. and 85% relative humidity.

17. Process according to claim 1, wherein the thermoplastic film has an oxygen permeability of at most 50 cm³/m²/24 hours/atm at 10° C. and 85% relative humidity.

18. Process according to claim 1, wherein the thermoplastic film has an oxygen permeability of at most 20 $cm^3/m^2/24$ hours/atm at 10° C. and 85% relative humidity.

19. Process according to claim 1, wherein thermoplastic polymer used for the thermoplastic film is a polyamide, a polyester, a polyether, the copolymers thereof, or a mixture of at least two of these thermoplastic polymers.

20. Process according to claim 1, wherein thermoplastic polymer used for the thermoplastic film is a polyamide, polyetherester, polyetheramide, or mixtures thereof.

* * * * *